Figure 1:
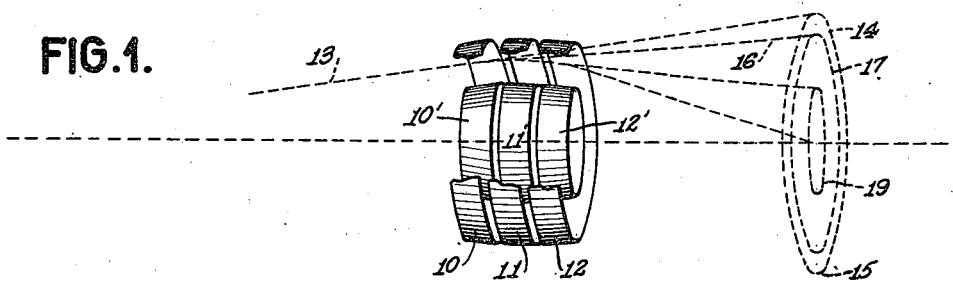

Dec. 24, 1946.  G. P. CHEVIGNY ET AL  2,412,965
ELECTRODE STRUCTURE
Filed July 10, 1941

VERTICAL DEFLECTION

HORIZONTAL DEFLECTION

INVENTORS
GEORGES P. CHEVIGNY
HENRI G. BUSIGNIES
BY
ATTORNEY

Patented Dec. 24, 1946

2,412,965

UNITED STATES PATENT OFFICE 2,412,965

ELECTRODE STRUCTURE

Georges Paul Chevigny, Kew Gardens, and Henri G. Busignies, Forest Hills, N. Y., assignors to International Standard Electric Corporation Application July 10, 1941, Serial No. 401,740

8 Claims. (Cl. 250—158)

This invention relates to improvements in electrodes for electron discharge devices, and in particular to improved deflecting electrodes for cathode ray tubes.

It is an object of the invention to provide improved means for controlling the magnitude of deflection of a cathode ray beam.

Another object is to increase the sensitivity of cathode ray devices.

A further object is to provide improved means for controlling the amount of deflection of a cathode ray beam for given applied deflecting potentials.

Other objects and various further features of novelty and invention will hereinafter be pointed out or will become apparent from a reading of the following specification in conjunction with the drawing included herewith. In said drawing—

Figure 2:
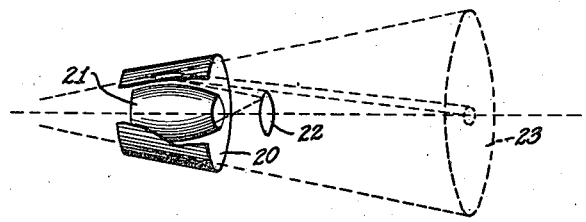
Figure 3:
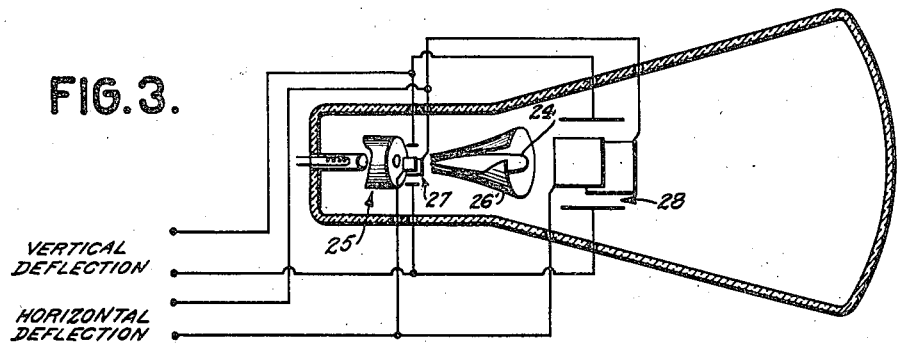
Figure 4:
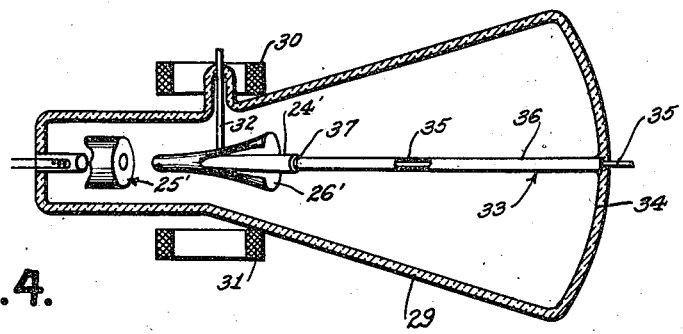

Figs. 1 and 2 are schematic showings illustrating principles of operation of devices according to the invention, and Figs. 3 and 4 are partly broken away and partly sectionalized showings of preferred forms of the invention.

When a cathode ray tube is employed as a device for indicating some quantity such as a phase angle, it is customary to set up a circular sweep of the ray by means of quadrature currents applied to the deflection plates and to modulate this sweep radially with a control voltage proportional to the quantity in question. Such a control voltage may be applied to various electrodes, and as a rule it is applied between a pair of concentric electrodes disposed between the deflecting plates and the screen. These concentric electrodes may be of generally conical form and are considered undesirable because they permit only a very limited degree of radial modulation of the beam, and this to such an extent that it is not possible to form a spot near the center of the tube.

It is well known that the extent of radial deflection of a cathode ray depends upon the potential gradient transverse to the beam and upon the distance that the beam must traverse through a field having this gradient. With the known forms of concentric conical electrodes, both electrodes must be relatively closely spaced in order to maintain a uniform control field therebetween. As a result it is only possible to obtain relatively limited radial deflections.

We have found that, by varying the shape of these concentric electrodes whereby a barrel-shaped path is prescribed for the electron beam, it will be possible to provide for radial deflection of the spot extending along any entire radius of the screen. It is thus possible, when desired, to return the beam spot to the center of the screen with each control voltage impulse.

How such a field may be set up and its effect upon a pair of electrons may be appreciated by referring to the schematic showing of Fig. 1. In this drawing three relatively short sets of concentric conical electrodes 10, 11, 12 illustrate what sort of effect may be expected of the proposed non-conical concentric electrode structure. The beam of electrons 13 may have a normal trajectory sweeping circularly so as to describe a generally circular orbit 14, 15 on the fluorescent screen of the tube. Now the effect of a relatively positive potential on the inner electrode 10' with respect to the corresponding outer one 10 will be to set up a radially inwardly extending potential gradient in the generally annular intervening space. A sudden application of this relative potential will therefore deflect the beam a slight amount to make it follow a new course 16 and to strike radially inwardly to some circumferential point on the orbit 17, 18.

A corresponding or similar relative potential applied between the next set of elements 11, 11' may have a like deflecting effect upon the beam, causing redeflection; and the simultaneous application of such potentials to elements 10, 10', 11, 11' may cause further deflection of the beam so as to strike orbit 19 peripherally. By applying additionally a strong enough potential between elements 12, 12', it appears clear that the beam may be caused to extend to the center of the screen, or even further, if so desired.

While the above described electrode arrangement may seem feasible, we consider it far too complex to be practical and, accordingly, prefer a more unitary construction, as shown in Fig. 2. In the form shown, the outer electrode 20 of the structure is of generally conical form. A generally barrel-shaped concentric inner electrode 21 seems to be preferable as it will permit almost any degree of radial deflection that may be desired. Furthermore, if desired an electron-intercepting disc-shaped plate electrode 22 may be provided, and this electrode may serve to limit the degree of radial deflection. In the form shown, electrode 22 intercepts all electrons that are deflected so much that they otherwise would form images on the fluorescent screen on both sides of the center of the screen.

The embodiment just described may find particular application in radiogoniometric systems in which it is desired to obtain a very clear angular indication upon a cathode ray tube screen. A circular sweep will continuously rotate the beam about an outer orbit 23; and, if angular indication impulse energy is applied between members 21 and 20, a sharply defined radial indication may be obtained. In other applications it may be desirable to show two angular indications simultaneously on the screen. In such a case, by properly adjusting the potential between members 20 and 21 to a mean biasing gradient, a deflecting potential in one polarity sense could serve to produce outward radial deflection momentarily, and a deflecting potential in the opposite polarity sense could serve to produce an inward momentary deflection. Thus, two simultaneous indications could be obtained with utmost clarity on the screen; and there could be no confusion as to the identity of each, inasmuch as each indication would extend radially in an opposite sense with respect to the other.

As indicated above, certain features of the invention relate to electrode means whereby effective cathode ray tube magnification may be increased or decreased as desired. It is thus contemplated that electrode means may be made to adapt the applied signal indications to a showing utilizing the entire cathode ray screen to best advantage. To this end, concentric electrodes analogous to those above discussed in connection with the forms of Figs. 1 and 2 may be employed. However, for maximum deflecting efficiency it is preferred that these concentric electrodes be disposed as near as possible to the outlet of the electron gun.

Such an arrangement, utilizing electrostatic deflection throughout, is shown in Fig. 3. In the form shown the inner member 24 of the concentric electrode structure is of tear drop shape with the pointed end directed toward the electron gun 25. In order to locate the concentric electrodes 24, 26 as close to the origin of deflection as possible the lateral or sweep circuit deflection plates 27 are preferably of minimum size, that is, only large enough slightly to deflect the beam so as to avoid collision with the inner electrode 24. It will be recalled by analogy of the form of electrode structure 24, 26 to those of the foregoing figures, that its function will be of a biasing nature, determining in effect a magnification or diminution of deflections originating at the plates 27.

It is believed that, since deflection plates 27 are so small, their accuracy of control may not be as great as desired. In this case, we propose the use of an additional set of relatively large plates 28 disposed in the same electrical sense or phase relation as plates 27, whereby a more strict and uniform control of sweeping may be assured. Although this additional set of plates 28 seems to us at present to have particular application in cooperation with set 27 for generating a circular sweep, it is clear that plates 28 may be energized wholly independent of plates 27 and employed for other purposes.

In another form of the invention it is possible to eliminate any need for two sets of deflecting plates, as in the case of Fig. 3, and at the same time to maintain as high efficiency and accuracy of the sweeping operation. This alternate form is shown in Fig. 4 in which the arrangement of elements is substantially that of Fig. 3 with the exception that magnetic means are used for deflection rather than electrostatic means. The tube of Fig. 4 thus comprises within an evacuated envelope 29, an electron gun 25' and a concentric radial deflection structure 24', 26'. The magnetic deflection means for one axial sense is shown schematically to comprise a pair of coils 30, 31. For purposes of clarity the other pair of coils for deflection, say, in a sense perpendicular to that of coils 30, 31, is omitted from the drawing. It is clear that by providing magnetic means for generating the circular sweeping energy, it is possible to arrange this circular deflection to take place at substantially the same axial position as the radial deflection, due to members 24', 26'. This arrangement is considered preferable inasmuch as members 24', 26' may extend into close proximity with the electron gun and circular sweeping may be performed simultaneously with radial deflection.

Fig. 4 additionally illustrates a preferred means or manner of supporting our novel electrode structure. Since electrons pass within member 26', this electrode may be supported in a conventional manner by a relatively rigid lead in member 32. Appropriate support for the inner electrode 24' presents more of a problem, but this may be accomplished by means of a rigid lead-in line 33, sealed to the center of the bulb or screen end 34 of the tube. In order not to have potentials impressed on line 33 in any way interfere with the passage of electrons as controlled by members 24' and 26' and the magnetic coils, we propose that line 33 comprise a concentric line, as shown clearly in the broken-away portion. Control potentials may be supplied to electrode 24' by means of inner conductor 35. The outer conductor 36 may be electrically spaced from electrode 24' by means of an insulating washer 37', and if it is given a potential equal to substantially that of the fluorescent screen, varying potentials on inner conductor 35 will have no effect upon the electron beam except as applied to electrode 24'.

In designing electrode structures in accordance with the invention, it is considered preferable that the form of the outer electrode approximate the shape of average flight of the electron beam. Thus, in Fig. 2, outer electrode 20 is substantially frusto-conical, the electrode structure being spaced substantially from the electron gun or origin of deflection (not shown); and in Fig. 4 electrode 26' is of the form of a generally inverse hyperbola or parabola of revolution, since it is disposed near the origin of deflection.

Although the invention has been described in particular detail in connection with the preferred forms illustrated, it is to be understood as not limited merely thereto.

What is claimed is:

1. In a cathode ray device, an electron gun, lateral deflection means, a fluorescent screen, and concentric electrostatic deflection means for radial deflection, said last-mentioned means comprising an inner generally cylindrical member and an outer generally cylindrical member, said members diverging progressively with respect to each other toward said fluorescent screen.

2. In a cathode ray device, an electron gun, lateral deflection means, a fluorescent screen, and concentric electrostatic deflection means for radial deflection, said last-mentioned means comprising inner generally cylindrical electrode means and outer generally cylindrical electrode means, said inner electrode means and said outer electrode means diverging progressively with respect to each other toward said fluorescent screen.

3. A cathode ray device according to claim 1, in which said inner member is of generally conical form having an apex in proximity to said electron gun.

4. A cathode ray device according to claim 1, in which said lateral deflection means comprises coil means disposed about said device at substantially the same axial location as said concentric deflection means.

5. In a cathode ray device having a generally cylindrical electrode disposed coaxially of the device, a support for said electrode comprising a relatively rigid lead-in secured to the center of one end of said device and to said electrode, said lead-in including a coaxial line having an inner conductor and an outer conductor, said inner conductor being conductively associated with said electrode, and said outer conductor being insulated from said electrode and providing a conducting shield for said inner conductor.

6. A cathode ray device according to claim 1, further comprising a disc-shaped target electrode between said concentric means and said fluorescent screen, said target electrode being coaxially disposed with respect to said concentric means.

7. In a cathode ray device, an electron gun, a first set of lateral deflection plates, a concentric electrode structure concentric with said gun and more remote from said gun than said first set of plates, and a second set of lateral deflection plates more remote from said gun than said concentric structure.

8. A cathode ray device according to claim 7 in which said first and said second sets of deflection plates are similar in number and are connected in the same electrical phase relation.

HENRI G. BUSIGNIES.
GEORGES PAUL CHEVIGNY.